United States Patent
Ohsumi et al.

(10) Patent No.: US 6,271,300 B1
(45) Date of Patent: Aug. 7, 2001

(54) THERMOREVERSIBLE THICKENING BINDER COMPOSITION

(75) Inventors: Tatsuya Ohsumi; Toshihiro Kanzawa, both of Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 0 days.

(21) Appl. No.: 08/602,790

(22) PCT Filed: Jun. 5, 1995

(86) PCT No.: PCT/JP95/01106
§ 371 Date: Mar. 7, 1996
§ 102(e) Date: Mar. 7, 1996

(87) PCT Pub. No.: WO96/01877
PCT Pub. Date: Jan. 25, 1996

(30) Foreign Application Priority Data

Jul. 8, 1994 (JP) .................................... 6-180534
Nov. 14, 1994 (JP) .................................... 6-305597
Nov. 18, 1994 (JP) .................................... 6-309562

(51) Int. Cl.$^7$ ........................................ C08L 25/02
(52) U.S. Cl. .............. 524/521; 524/503; 524/515; 524/516; 524/517; 524/522; 524/523; 524/524; 524/525; 524/526; 524/527; 524/528; 524/167; 524/291; 524/323
(58) Field of Search ...................... 524/521, 503, 524/515, 516, 517, 522, 523, 524, 525, 526, 527, 528, 167, 291, 323

(56) References Cited

U.S. PATENT DOCUMENTS 5,057,560 * 10/1991 Mueller ................................ 524/521
5,262,474 11/1993 Minnis et al. ........................ 524/556
5,658,981 * 8/1997 Ohsumi ................................ 524/555

FOREIGN PATENT DOCUMENTS

| 0 359 349 A2 | 3/1990 | (EP) . |
| 359349 | * 3/1990 | (EP) . |
| 01014276 | * 1/1989 | (JP) . |
| 64-14276 | 1/1989 | (JP) . |
| 6-299000 | 10/1994 | (JP) . |
| 91-03520 | 3/1991 | (WO) . |

* cited by examiner

Primary Examiner—Judy M. Reddick
(74) Attorney, Agent, or Firm—Kubovcik & Kubovcik

(57) ABSTRACT

A thermoreversibly thickening binder composition, comprises a resin latex wherein the amount of an emulsifier in the aqueous phase is smaller than 0.01 mmol/g, and a vinyl polymer having reversibility of hydrophilicity and hydrophobicity at a certain transition temperature. The resin latex is preferably prepared by using an emulsifier having a radically polymerizable group, and preferable as said vinyl polymer is a polymer having a cation-forming group. The binder composition exhibits an excellent chemical stability to factors other than heat without causing migration of the latex resin particles onto the surface of the coated layer even during the time of heat-drying, and thermoreversible thickening effects caused by a sharp heat-sensitive gelling properties. When applied to preparation of coated paper and pressure-sensitive recording sheet, the binder composition provides products excellent in gloss, printability and color producing properties.

18 Claims, No Drawings

THERMOREVERSIBLE THICKENING BINDER COMPOSITION

FIELD OF THE INVENTION

This invention relates to a thermoreversible binder composition having a high chemical stability to factors other than heat. The thermoreversibly thickening binder composition of the invention produces an excellent gloss and printability when used as a component of coating materials in manufacturing coated paper and exhibits a rapid color development speed and an excellent color deepness, when used in manufacturing heat-sensitive recording sheets or pressure-sensitive recording sheets.

BACKGROUND ART

Description of the Prior Art

Recently, Ito et al. have disclosed in JP A 1-14276 a thermoreversible acrylamide polymer thickener, for example, a temperature-sensitive gelling composition comprising poly(N-isopropyl acrylamide) and a resin emulsion. Kimura et al. disclose in JP A 4-261453 a temperature-sensitive gelling composition comprising a resin latex having a chemical stability index of not more than 24, a polyvalent metal salt and an adduct of an alkylene oxide of an alkylphenol-formalin condensate, which adduct is a non-thermoreversible thickener. However, while disclosing, as a resin latex having a specific chemical stability index, a latex obtained by polymerizing vinyl monomers by using a smaller amount of a surface active agent or a self-emulsified latex obtained by using a polymerizable emulsifying agent, they make no mention of the amount of the emulsifier in the aqueous phase of the latex. The term "chemical stability index" means an index showing the chemical stability of a latex as expressed by the time required for the latex to coagulate and solidify after an aqueous solution of aluminum sulfate has been added thereinto. The actual method of measuring the index will be explained in the Reference Example 1.

By the way, in order that polymer particles be stably dispersed in an aqueous phase of a latex, emulsifier molecules need only to be chemically or physically bound to the polymer particles and need not exist in the aqueous phase. In order to impart a temperature-sensitive property to a latex and further strengthen the property, it is rather desirable that emulsifiers do not exist in the aqueous phase. In many applications of the binder compositions where a temperature-sensitive gelling property is required, a various kind of auxiliary agents which are water-soluble or water-dispersible and also ionic are frequently compounded therewith, thus the stability of the latex to factors other than heat tends to be impaired. This leads to a tendency to use a polymerizable or non-polymerizable emulsifier, in preparing the latex, in an amount larger than required, leaving an excessive amount of the emulsifier remaining in the aqueous phase. Accordingly, in the prior arts mentioned above, chemical stability to the factors other than heat and improvements in gloss, printability and color development property in the practical application remain insufficient. Thus, the conventional temperature-sensitive gelling compositions are not good enough in exhibiting a temperature-sensitive gelling property, and, therefore, the use thereof in coating paper gave problems that ① no excellent gloss was obtained, because pigments such as clay and calcium carbonate in the color coating composition could not be satisfactorily orientated by calendaring and ② no satisfactory printability was obtained, because the resin concentration on the surface of the coated layer became much higher than it was required. There was also a problem that no satisfactory color development was obtained when the compositions were applied to pressure-sensitive recording sheet or heat-sensitive recording sheet uses.

DISCLOSURE OF THE INVENTION

It is an object of the invention to provide a thermoreversibly thickening binder composition which has an excellent chemical stability to factors other than heat and sharp temperature-sensitive gelation properties and is suitable for use as a component of coating materials for coated paper, etc. without causing migration of latex resin particles onto the surface of coated layer even when dried by heating.

As the result of our researches on binder compositions to be used for coated paper, etc. to attain the object, we have found that, by using a vinyl polymer exhibiting a reversible transition from hydrophilicity to hydrophobicity at a certain transition temperature in combination with a resin latex containing an emulsifier in the aqueous phase only in a smaller amount, migration of the latex resin particles onto the coated surface can be suppressed. We have further found that such an improvement is also effective, in applications to pressure-sensitive recording sheet or heat-sensitive recording sheet, to suppress the decrease in color development by binder migration.

Thus, according to the present invention, a thermoreversibly thickening binder composition is disclosed, comprising (A) a resin latex wherein the amount of emulsifier in the aqueous phase is not larger than 0.01 mmol/g resin, and (B) a vinyl polymer which exhibits a reversible transition from hydrophilicity to hydrophobicity at a certain transition temperature. In order to attain the object of the present invention, it is required that the amount of emulsifier in the aqueous phase of the resin latex (A) used in the binder composition is not larger than 0.01 mmol/g resin, preferably not larger than 0.002 mmol/g resin. When the amount of emulsifier in the aqueous phase exceeds 0.01 mmol/g, the function of the vinyl polymer (B) exhibiting a reversible transition from hydrophilicity to hydrophobicity at a certain transition temperature will be inhibited, and the resulting binder composition does not provide a product having a satisfactory gloss, printability and color development. In the present invention, the amount of emulsifier in the aqueous phase is the value expressed based on the weight of the resin in the resin latex (A), which can be determined by quantitative analysis, such as liquid chromatography, of the aqueous phase of the resin latex (A) wherefrom the resin has been removed. To remove the resin from the resin latex, there may be used various methods, for example, those by freezing and then melting the resin latex to coagulate the resin component into solid followed by removing the solid, those by centrifuging the resin latex followed by removing the settled and solidified resin component, and those by adding an acid or an alkali to the resin latex followed by removing the settled and solidified resin component.

BEST MODE OF CARRYING OUT THE INVENTION

The thermoreversibly thickening binder composition of the invention, the constituent materials and the methods of preparation and application thereof, will be explained in more detail by way of examples.

First, the resin latex (A) in which the amount of emulsifier in the aqueous phase is not larger than 0.01 mmol/g, one of the constituents of the thermoreversibly thickening binder composition of the invention, will be explained. The resin constituting the resin latex (A) is a (co)polymer of various kinds of monomers. Examples of the monomers, which are not particularly limited, are (meth)acrylic esters such as methyl (meth)acrylates, ethyl (meth)acrylates, butyl (meth)acrylates, cyclohexyl (meth)acrylates, lauryl (meth)acrylates, octadecyl (meth)acrylates, glycidyl (meth)acrylates, trimethoxysilylpropyl (meth)acrylates, hydroxyethyl (meth)acrylates, diethylene glycol mono (meth)acrylates, polyethylene glycol mono(meth)acrylates, (meth)acryloyloxypolyglycerols, 2-cyanoethyl (meth)acrylates, N,N-dimethylaminoethyl (meth)acrylates, N,N-dimethylaminopropyl (meth)acrylates, N,N-diethylaminoethyl (meth)acrylates and N,N-diethylaminopropyl (meth)acrylates; (meth)acrylamides such as N,N-dibutyl (meth)acrylamides, N-cyclohexyl (meth)acrylamides, (meth)acrylamides. N-methyl (meth)acrylamides, N-methylol (meth)acrylamides and N,N-dimethylaminoethyl (meth)acrylamides; vinyl cyanides such as (meth)acrylonitriles; styrenes such as styrene, 1-methylstyrene and p-aminostyrene; vinyl carboxylates such as vinyl acetate; conjugated dienes such as butadiene, isoprene and chloroprene; ethylenically unsaturated carboxylic acids such as (meth)acrylic acids, maleic acid (anhydride), fumaric acid, itaconic acid and vinyl benzoic acid; (meth)acrylamine imides such as 1,1,1-trimethylamine (meth)acrylimides, 1,1-dimethyl-1-ethylamine (meth)acrylimides, 1,1-demethyl-1-(2'-phenyl-2'-hydroxyethyl) amine (meth)acrylimides and 1,1,1-trimethylamine (meth)acrylimides; and other vinyl monomers such as vinyl trimethoxysilane, vinyl alcohol, vinyl chloride, allyl alcohol, N-vinyl-2-pyrrolidone, vinyl imidazole, N-methylol-ε-caprolactam, N-methylolmaleimide, N-vinylsuccinimide, N-vinylcarbazole, 2-vinylpyridine, vinyl sulfonic acid, (meth)acrylic sulfonic acids, styrene sulfonic acid, alkylallyl sulfosuccinates, (meth)acryloylpolyoxyalkylene sulfuric esters and vinyl aniline; and combinations thereof.

As the resin latex (A) used in the present invention, among the resins obtained by (co)polymerizing the above-mentioned monomer(s), latexes of a styrene-butadiene resin, a styrene-acrylic resin, an acrylic resin, a vinyl acetate resin or a ethylene-vinyl acetate resin are preferable, a latex of a styrene-butadiene resin being particularly preferable because of its superior adhesive power.

In order to prepare a resin latex (A) wherein the amount of emulsifier in the aqueous phase is not larger than 0.01 mmol/g, various methods can be used such as emulsion polymerization of polymerizable monomers by using a non-polymerizable emulsifier of low solubility in water, emulsion polymerization of polymerizable monomers by using an emulsifier having a radically polymerizable group, emulsion polymerization of monomers by using a water-soluble polymer as a protective colloid, and (co)polymerization in an organic solvent of a polymerizable monomer having an ionizable group followed by neutralizing the resulting polymer with an acid or alkali, emulsifying it by adding water and then removing the solvent. As a non-polymerizable emulsifier of low solubility in water, there may be mentioned ones having a HLB value of 3 to 9, for example, amine or alkali metal salts of a fatty acid having 22 or more carbon atoms and adducts of 1 to 6 mole ethylene oxide to an aliphatic or aromatic alcohol having 15 or more carbon atoms.

Among these polymerization methods, the methods of emulsion polymerizations are preferable because of producing a latex of a high-molecular weight resin, particularly preferable being the method of emulsion polymerization of polymerizable monomers by using a emulsifier (a) having a radically polymerizable group, examples of which will be explained in the following.

Emulsifiers (a) having a radically polymerizable group include, for example, the compounds described below.

(1) Anionic (meth)acrylic esters, such as i  $CH_2=C(R_1)CO_2(CH_2)_m SO_3M$, wherein $R_1$ denotes a hydrogen atom or a methyl group, m an integer of 1 to 24, and M an alkali metal ion, ammonium ion or an aminium ion;

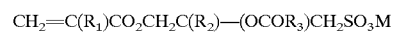 $CH_2=C(R_1)CO_2CH_2C(R_2)-(OCOR_3)CH_2SO_3M$ or

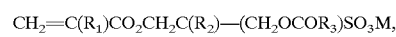 $CH_2=C(R_1)CO_2CH_2C(R_2)-(CH_2OCOR_3)SO_3M$, wherein $R_1$ and $R_2$ denote a hydrogen atom or a methyl group, $R_3$ an alkyl, alkenyl or aralkyl group having 4 to 21 carbon atoms, M an alkali metal ion, ammonium ion or an aminium ion;

ii 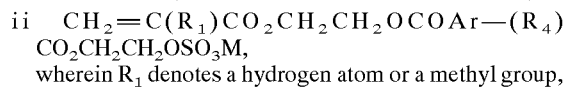 $CH_2=C(R_1)CO_2CH_2CH_2OCOAr-(R_4)CO_2CH_2CH_2OSO_3M$, wherein $R_1$ denotes a hydrogen atom or a methyl group, Ar an aromatic ring, $R_4$ a hydrogen atom or an alkyl, alkenyl or aralkyl group having 1 to 21 carbon atom(s), and M an alkali metal ion, ammonium ion or an aminium ion; and iii $CH_2=C(R_1)CO(AO)_pOSO_3M$ or $CH_2=C(R_1)CO(AO)_pOCH_2CO_2M$, wherein $R_1$ denotes a hydrogen atom or a methyl group, AO an oxyalkylene group having 2 to 4 carbon atoms, p an integer of 2 to 200, and M an alkali metal ion, ammonium ion or an aminium ion.

(2) Anionic (meth)acrylic acid amides, such as i $CH_2=C(R_1)CONH(CH_2)_mSO_3M$, wherein $R_1$ denotes a hydrogen atom or a methyl group, m an integer of 1 to 24, and M an alkali metal ion, ammonium ion or an aminium ion;

ii $CH_2=C(R_1)CONHCH_2C-(R_2)(OCOR_3)CH_2SO_3M$ or $CH_2=C(R_1)CONHCH_2C(R_2)-(CH_2OCOR_3)SO_3M$, wherein $R_1$ and $R_2$ denote a hydrogen atom or a methyl group, $R_3$ an alkyl, alkenyl or aralkyl group having 4 to 21 carbon atoms, and M an alkali metal ion, ammonium ion or an aminium ion;

iii 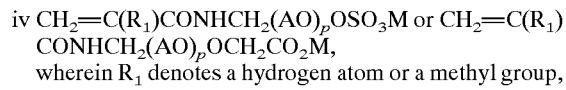 $CH_2=C(R_1)CONHCH_2CH_2OCOAr-(R_4)CO_2CH_2CH_2OSO_3M$, wherein $R_1$ denotes a hydrogen atom or a methyl group, Ar an aromatic ring, $R_4$ a hydrogen atom or an alkyl, alkenyl or aralkyl group having 1 to 21 carbon atom(s), and M an alkali metal ion, ammonium ion or an aminium ion; and iv $CH_2=C(R_1)CONHCH_2(AO)_pOSO_3M$ or $CH_2=C(R_1)CONHCH_2(AO)_pOCH_2CO_2M$, wherein $R_1$ denotes a hydrogen atom or a methyl group, AO an oxyalkylene group having 2 to 4 carbon atoms, p an integer of 2 to 200, and M an alkali metal ion, ammonium ion or an aminium ion.

(3) Anionic allyl compounds, such as i $CH_2=CHCH_2O(CH_2)_mSO_3M$, wherein m denotes an integer of 1 to 24, and M an alkali metal ion, ammonium ion or an aminium ion;

ii $CH_2=CHCH_2(AO)_pOSO_3M$ or $CH_2=CHCH_2(AO)_pOCH_2CO_2M$, wherein AO denotes an oxyalkylene group having 2 to 4 carbon atoms, p an integer of 2 to 200, and M an alkali metal ion, ammonium ion or an aminium ion;

iii $CH_2=CHCH_2OCOCH(SO_3M)CH_2CO_2R_3$, wherein M denotes an alkali metal ion, ammonium ion or an aminium ion, and R3 an alkyl, alkenyl or aralkyl group having 4 to 21 carbon atoms;

iv $CH_2=CHCH_2OCH_2CH(OH)CH_2O-COCH(SO_3M)CH_2CO_2R_3$, wherein M denotes an alkali metal ion, ammonium ion or an aminium ion, and $R_3$ an alkyl, alkenyl or aralkyl group having 4 to 21 carbon atoms;

v. $(R_3)(R_4)Ar(CH_2CH=CH_2)-(AO)_pOSO_3M$, wherein $R_3$ denotes an alkyl, alkenyl or aralkyl group having 4 to 21 carbon atoms, $R_4$ a hydrogen atom or an alkyl, alkenyl or aralkyl group having 1 to 21 carbon atoms, Ar an aromatic ring, AO an oxyalkylene group having 2 to 4 carbon atoms, p an integer of 2 to 200, and M an alkali metal ion, ammonium ion or an aminium ion; and vi. $CH_2=CHCH_2OCH_2CH-[(AO)_qOSO_3M]CH_2O(AO)_pOR_4$ or $CH_2=CHCH_2OCH_2CH-[(AO)_qOCH_2CO_2M]CH_2(AO)_pOR_4$, wherein AO denotes an oxyalkylene group having 2 to 4 carbon atoms, q denotes 0 or a positive integer of 1 to 100, M an alkali metal ion, ammonium ion or an aminium ion, p an integer of 2 to 200, and $R_4$ a hydrogen atom or an alkyl, alkenyl or aralkyl group having 1 to 21 carbon atom(s).

(4) Anionic maleic acid esters, such as i $R_3OCOCH=CHCO_2CH_2CH-(OH)CH_2SO_3M$, wherein $R_3$ denotes an alkyl, alkenyl or aralkyl group having 4 to 21 carbon atoms, and M an alkali metal ion, ammonium ion or an aminium ion;

ii $R_4(AO)_qOCOCH=CHCO_2-(CH_2)_mCH(R_5)SO_3M$, wherein $R_4$ and $R_5$ denote a hydrogen atom or an alkyl, alkenyl or aralkyl group having 1 to 21 carbon atom(s), AO an oxyalkylene group having 2 to 4 carbon atoms, q denotes 0 or a positive integer of 1 to 100, m denotes 0 or a positive integer of 1 to 24, and M an alkali metal ion, ammonium ion or an aminium ion;

iii $R_4(AO)_pOCOCH=CHCO_2M$, wherein $R_4$ denotes a hydrogen atom or an alkyl, alkenyl or aralkyl group having 1 to 21 carbon atom(s), AO an oxyalkylene group having 2 to 4 carbon atoms, p an integer of 2 to 200, and M an alkali metal ion, ammonium ion or an aminium ion; and iv $MACH_2CH(R_1)(AO)_pOSO_3M$ or $MACH_2CH(R_1)(AO)_pOCH_2COOM$, wherein MA denotes a maleimide group, $R_1$ a hydrogen atom or a methyl group, AO an oxyalkylene group having 2 to 4 carbon atoms, p an integer of 2 to 200, and M an alkali metal ion, ammonium ion or an aminium ion.

(5) Anionic itaconic esters, such as i $CH_2=C(CH_2CO_2R_3)CO_2(CH_2)_mSO_3M$, wherein $R_3$ denotes an alkyl, alkenyl or aralkyl group having 4 to 21 carbon atoms, m an integer of 1 to 24, and M an alkali metal ion, ammonium ion or an aminium ion;

ii $CH_2=C(CH_2CO_2R_3)CO_2CH_2CH-(OH)CH_2SO_3M$, wherein $R_3$ denotes an alkyl, alkenyl or aralkyl group having 4 to 21 carbon atoms, and M an alkali metal ion, ammonium ion or an aminium ion; and iii $CH_2=C[CO(AO)_qOR_4]CO_2-(CH_2)_mCH(R_5)SO_3M$, wherein $R_4$ and $R_5$ denote a hydrogen atom or an alkyl, alkenyl or aralkyl group having 1 to 21 carbon atom(s), AO an oxyalkylene group having 2 to 4 carbon atoms, p an integer of 2 to 200, m denotes 0 or a positive integer of 1 to 24, and M an alkali metal ion, ammonium ion or an aminium ion.

(6) Anionic aromatic vinyl compounds, such as i $CH_2=CHAr(CH_2)_rSO_3M$, wherein Ar denotes an aromatic ring, r an integer of 4 to 24, and M an alkali metal ion, ammonium ion or an aminium ion; and ii $CH_2=CHAr(AO)_pOSO_3M$ or iii $CH_2=CHAr(AO)_pOCH_2CO_2M$, wherein Ar denotes an aromatic ring, p an integer of 2 to 200, and M an alkali metal ion, ammonium ion or an aminium ion.

(7) Nonionic (meth)acrylic esters, such as i $CH_2=C(R_1)CO(EO)_pOR_3$, wherein $R_1$ denotes a hydrogen atom or a methyl group, EO an oxyethylene group, p an integer of 2 to 200, and $R_3$ an alkyl, alkenyl or aralkyl group having 4 to 21 carbon atoms; and ii $CH_2=C(R_1)CO(PO)_p(EO)_sOR_4$ or $CH_2=C(R_1)CO(EO)_p(PO)_sOR_4$, wherein $R_1$ denotes a hydrogen atom or a methyl group, PO an oxypropylene group, EO an oxyethylene group, p and s integers of 2 to 200, and $R_4$ a hydrogen atom or an alkyl, alkenyl or aralkyl group having 1 to 21 carbon atom(s).

(8) Nonionic (meth)acrylic acid amides, such as i $CH_2=C(R_1)CONHCH_2(EO)_pOR_3$, wherein $R_1$ denotes a hydrogen atom or a methyl group, EO an oxyethylene group, p an integer of 2 to 200, and $R_3$ an alkyl, alkenyl or aralkyl group having 4 to 21 carbon atoms; and ii $CH_2=C(R_1)CONHCH_2-(PO)_p(EO)_sOR_4$ or $CH_2=C(R_1)CONHCH_2-(EO)_p(PO)_sOR_4$, wherein $R_1$ denotes a hydrogen atom or a methyl group, PO an oxypropylene group, EO an oxyethylene group, p and s integers of 2 to 200, and $R_4$ a hydrogen atom or an alkyl, alkenyl or aralkyl group having 1 to 21 carbon atom(s).

(9) Nonionic allyl compounds, such as i $CH_2=CHCH_2(EO)_pOR_3$, wherein EO denotes an oxyethylene group, p an integer of 2 to 200, and $R_3$ an alkyl, alkenyl or aralkyl group having 4 to 21 carbon atoms;

ii $CH_2=CHCH_2(PO)_p(EO)_sOR_4$ or $CH_2=CHCH_2(EO)_p(PO)_sOR_4$, wherein PO denotes an oxypropylene group, EO an oxyethylene group, p and s integers of 2 to 200, and $R_4$ a hydrogen atom or an alkyl, alkenyl or aralkyl group having 1 to 21 carbon atom(s); and iii $(R_3)(R_4)Ar(CH_2CH=CH_2)-(EO)_pOR_5$ or $(R_3)(R_4)Ar(CH_2CH=CH_2)-(PO)_p(EO)_sOR_5$ or $(R_3)(R_4)Ar(CH_2CH=CH_2)-(EO)_p(PO)_sOR_5$, wherein $R_3$ denotes an alkyl, alkenyl or aralkyl group having 4 to 21 carbon atoms, $R_4$ and $R_5$ a hydrogen atom or an alkyl, alkenyl or aralkyl group having 1 to 21 carbon atom(s), EO an oxyethylene group, PO an oxypropylene group, and p and s integers of 2 to 200.

(10) Nonionic maleic esters, such as i $R_3(EO)_pOCOCH=CHCO(AO)_sR_4$ or $R_3(AO)_pOCOCH=CHCO(EO)_sR_4$, wherein $R_3$ denotes an alkyl, alkenyl or aralkyl group having 4 to 21 carbon atoms, EO an oxyethylene group, p and s integers of 2 to 200, AO an oxyalkylene group having 2 to 4 carbon atoms, and $R_4$ a hydrogen atom or an alkyl, alkenyl or aralkyl group having 1 to 21 carbon atom(s);

ii $MACH_2CH(R_1)(EO)_pR_3$, wherein MA denotes a maleimide group, $R_1$ a hydrogen atom or a methyl group, EO an oxyethylene group, p an integer of 2 to 200, and $R_3$ an alkyl, alkenyl or aralkyl group having 4 to 21 carbon atoms; and iii $MACH_2CH(R_1)(PO)_p(EO)_sR_4$ or $MACH_2CH(R_1)(EO)_p(PO)_sR_4$, wherein MA denotes a maleimide group, $R_1$ a hydrogen atom or a methyl group, EO an oxyethylene group, PO an oxypropylene group, p and s integers of 2 to 200, and $R_4$ a hydrogen atom or an alkyl, alkenyl or aralkyl group having 1 to 21 carbon atom(s).

(11) Nonionic itaconic esters, such as i $CH_2=C[CH_2CO(AO)_pOR_4]-CO(AO)_qOR_5$ or $CH_2=C[CH_2CO(AO)_qOR_4]-CO(AO)_pOR_5$ wherein AO denotes an oxyalkylene group having 2 to 4 carbon atoms, p is an integer of 2 to 200, q denotes 0 or a positive integer of 1 to 100, and $R_4$ and $R_5$ a hydrogen atom or an alkyl, alkenyl or aralkyl group having 1 to 21 carbon atom(s).

(12) Nonionic aromatic vinyl compounds, such as i $CH_2=CHAr(EO)_pOR_3$, wherein Ar denotes an aromatic ring, EO an oxyethylene group, p an integer of 2 to 200, and $R_3$ an alkyl, alkenyl or aralkyl group having 4 to 21 carbon atoms.

(13) Cationic (meth)acrylic esters, such as i $[CH_2=C(R_1)CO_2CH_2CH-(OH)CH_2N(R_4)_3]X$, wherein $R_1$ denotes a hydrogen atom or a methyl group, $R_4$ a hydrogen atom or an alkyl, alkenyl or aralkyl group having 1 to 21 carbon atom(s), and X a halogen atom, $NO_3$, $HSO_4$, $CH_3OSO_2$, $(CH_3O)_2PO_2$, $CH_3CO_2$ or $HCO_3$; and ii $[CH_2=C(R_1)CO(AO)_pN(R_4)_3]X$, wherein $R_1$ denotes a hydrogen atom or a methyl group, AO an oxyalkylene group having 2 to 4 carbon atoms, p an integer of 2 to 200, $R_4$ a hydrogen atom or an alkyl, alkenyl or aralkyl group having 1 to 21 carbon atom(s), and X a halogen atom, $NO_3$, $HSO_4$, $CH_3OSO_2$, $(CH_3O)_2PO_2$, $CH_3CO_2$ or $HCO_3$.

(14) Cationic (meth)acrylic acid amides, such as i $[CH_2=C(R_1)CONHCH_2CH_2CH-(OH)CH_2N(R_4)_3]X$, wherein $R_1$ denotes a hydrogen atom or a methyl group, $R_4$ a hydrogen atom or an alkyl, alkenyl or aralkyl group having 1 to 21 carbon atom(s), and X a halogen atom, $NO_3$, $HSO_4$, $CH_3OSO_2$, $(CH_3O)_2PO_2$, $CH_3CO_2$ or $HCO_3$; and ii $[CH_2=C(R_1)CONHCH_2-(AO)_pN(R_4)_3]X$, wherein $R_1$ denotes a hydrogen atom or a methyl group, AO an oxyalkylene group having 2 to 4 carbon atoms, p an integer of 2 to 200, $R_4$ a hydrogen atom or an alkyl, alkenyl or aralkyl group having 1 to 21 carbon atom(s), and X a halogen atom, $NO_3$, $HSO_4$, $CH_3OSO_2$, $(CH_3O)_2PO_2$, $CH_3CO_2$ or $HCO_3$.

(15) Cationic allyl compounds, such as i $[CH_2=CHCH_2O(CH_2)_mN(R_4)_3]X$, wherein m denotes an integer of 1 to 24, $R_4$ a hydrogen atom or an alkyl, alkenyl or aralkyl group having 1 to 21 carbon atom(s), and X a halogen atom, $NO_3$, $HSO_4$, $CH_3OSO_2$, $(CH_3O)_2PO_2$, $CH_3CO_2$ or $HCO_3$;

ii $[CH_2=CHCH_2(AO)_pN(R_4)_3]X$, wherein AO denotes an oxyalkylene group having 2 to 4 carbon atoms, p an integer of 2 to 200, $R_4$ a hydrogen atom or an alkyl, alkenyl or aralkyl group having 1 to 21 carbon atom(s), and X a halogen atom, $NO_3$, $HSO_4$, $CH_3OSO_2$, $(CH_3O)_2PO_2$, $CH_3CO_2$ or $HCO_3$;

iii $[CH_2=CHCH_2OCH_2CH(OH)CH_2-OCOCH(CH_2CO_2R_3)N(R_4)_3]X$, wherein $R_3$ denotes an alkyl, alkenyl or aralkyl group having 4 to 21 carbon atoms, $R_4$ a hydrogen atom or an alkyl, alkenyl or aralkyl group having 1 to 21 carbon atom(s), and X a halogen atom, $NO_3$, $HSO_4$, $CH_3OSO_2$, $(CH_3O)_2PO_2$, $CH_3CO_2$ or $HCO_3$;

iv $[(R_3)(R_4)Ar(CH_2CH=CH_2)-(AO)_pN(R_4)_3]X$, wherein $R_3$ denotes an alkyl, alkenyl or aralkyl group having 4 to 21 carbon atoms, $R_4$ a hydrogen atom or an alkyl, alkenyl or aralkyl group having 1 to 21 carbon atom(s), Ar an aromatic ring, AO an oxyalkylene group having 2 to 4 carbon atoms, p an integer of 2 to 200, and X a halogen atom, $NO_3$, $HSO_4$, $CH_3OSO_2$, $(CH_3O)_2PO_2$, $CH_3CO_2$ or $HCO_3$;

v $[CH_2=CHCH_2OCH(OH)CH_2N(R_4)_3]X$, wherein $R_4$ a hydrogen atom or an alkyl, alkenyl or aralkyl group having 1 to 21 carbon atom(s), and X a halogen atom, $NO_3$, $HSO_4$, $CH_3OSO_2$, $(CH_3O)_2PO_2$, $CH_3CO_2$ or $HCO_3$; and vi $[CH_2=CHCH_2N(R_4)_3]X$, wherein $R_4$ denotes a hydrogen atom or an alkyl, alkenyl or aralkyl group having 1 to 21 carbon atom(s), and X a halogen atom, $NO_3$, $HSO_4$, $CH_3OSO_2$, $(CH_3O)_2PO_2$, $CH_3CO_2$ or $HCO_3$.

(16) Cationic maleic esters, such as i $[R_3OCOCH=CHCO_2CH_2CH-(OH)CH_2N(R_4)_3]X$, wherein $R_3$ denotes an alkyl, alkenyl or aralkyl group having 4 to 21 carbon atoms, $R_4$ a hydrogen atom or an alkyl, alkenyl or aralkyl group having 1 to 21 carbon atom(s), and X a halogen atom, $NO_3$, $HSO_4$, $CH_3OSO_2$, $(CH_3O)_2PO_2$, $CH_3CO_2$ or $HCO_3$;

ii $[R_4(AO)_qOCOCH=CHCO_2-(CH_2)_mCH(R_5)N(R_6)_3]X$, wherein $R_4$, $R_5$ and $R_6$ denote a hydrogen atom or an alkyl, alkenyl or aralkyl group having 1 to 21 carbon atom(s), AO an oxyalkylene group having 2 to 4 carbon atoms, q denotes 0 or a positive integer of 1 to 100, m denotes 0 or a positive integer of 1 to 24, and X a halogen atom, $NO_3$, $HSO_4$, $CH_3OSO_2$, $(CH_3O)_2PO_2$, $CH_3CO_2$ or $HCO_3$; and iii $[MACH_2CH(R_1)(AO)_pN(R_4)_3]X$, wherein MA denotes a maleimide group, $R_1$ a hydrogen atom or a methyl group, AO an oxyalkylene group having 2 to 4 carbon atoms, p an integer of 2 to 200, $R_4$ a hydrogen atom or an alkyl, alkenyl or aralkyl group having 1 to 21 carbon atom(s), and X a halogen atom, $NO_3$, $HSO_4$, $CH_3OSO_2$, $(CH_3O)_2PO_2$, $CH_3CO_2$ or $HCO_3$.

(17) Cationic itaconic esters, such as i $[CH_2=C(CH_2CO_2R_3)CO_2-(CH_2)_mN(R_4)_3]X$, wherein $R_3$ denotes an alkyl, alkenyl or aralkyl group having 4 to 21 carbon atoms, m an integer of 1 to 24, $R_4$ a hydrogen atom or an alkyl, alkenyl or aralkyl group having 1 to 21 carbon atom(s), and X a halogen atom, $NO_3$, $HSO_4$, $CH_3OSO_2$, $(CH_3O)_2PO_2$, $CH_3CO_2$ or $HCO_3$.

(18) Cationic aromatic vinyl compounds, such as i $[CH_2=CHAr(CH_2)_rN(R_4)_3]X$, wherein Ar denotes an aromatic ring, r an integer of 4 to 24, $R_4$ a hydrogen atom or an alkyl, alkenyl or aralkyl group having 1 to 21 carbon atom(s), and X a halogen atom, $NO_3$, $HSO_4$, $CH_3OSO_2$, $(CH_3O)_2PO_2$, $CH_3CO_2$ or $HCO_3$; and ii $[CH_2=CHAr(AO)_pN(R_4)_3]X$ or $[CH_2=CHAr(AO)_pON(R_4)_3]X$, wherein Ar denotes an aromatic ring, AO an oxyalkylene group having 2 to 4 carbon atoms, p an integer of 2 to 200, $R_4$ a hydrogen atom or an alkyl, alkenyl or aralkyl group having 1 to 21 carbon atom(s) and X a halogen atom, $NO_3$, $HSO_4$, $CH_3OSO_2$, $(CH_3O)_2PO_2$, $CH_3CO_2$ or $HCO_3$.

Among these compounds, emulsifiers of the types (1), (2), (6), (7), (8), (12), (13), (14) and (18) are preferable because of their good copolymerizability with various kinds of monomers, especially styrene; and emulsifiers of the types (1) to (6) are preferable because they are hardly coagulated with pigment dispersing agents, such as polysodium (meth)acrylates, usually used in color coatings, and provide a tougher gel at the time of temperature-sensitive gelling. Particularly preferable are, among emulsifiers of the types (1) and (6), (meth)acrylic esters and aromatic vinyl compounds, having an anionic group and a polyoxypropylene chain.

In preparing a resin latex (A), the emulsifier (a) is used in an amount of usually 0.1 to 25% by weight, preferably 1 to 10% by weight, based on the weight of the resin in the resin latex.

In the emulsion polymerization for preparation of the resin latex (A), a polymerization initiator and a chain transfer agent can be used. Organic polymerization initiators used include, for example, peroxides such as cumene hydroperoxide, diisopropylbenzene hydroperoxide, p-menthane hydroperoxide, benzoyl peroxide and lauroyl peroxide, and azo compounds such as azobisisobutyronitrile and azobisisovaleronitrile. As inorganic polymerization initiators, can be mentioned, for example, persulfates such as sodium persulfate, ammonium persulfate and potassium persulfate. The amount of the polymerization initiator used is usually 0.01 to 5% by weight based on the weight of the resin in the resin latex.

In the present invention, a chain transfer agent can be used in order to control the molecular weight of the resin in the latex and the gel content of the latex. As chain transfer agents there may be mentioned dimers of α-methylstyrene such as 2,4-diphenyl-4-methyl-1-pentene, terpinolene, terpinene, dipentene, alkyl mercaptans having 8 to 18 carbon atoms, alkylene dithiols having 8 to 18 carbon atoms, thioglycolic acid alkyl esters, dialkylxanthogen disulfides, tetraalkylthiuram disulfides and carbon tetrachloride. These may be used singly or in combination of two or more kinds of them. The amount of the chain transfer agent used is usually 0 to 15 parts by weight per 100 parts by weight of the monomer(s) used.

In the process of emulsion polymerization, there may be contained reducing agents such as sodium pyrobisulfite, sodium sulfite, sodium hydrogen sulfate, ferrous sulfate, glucose, sodium sulfoxylate formaldehyde and L-ascorbic acid(salt); chelating agents such as glycine, alanine and ethylenediaminetetraacetic acid; buffering agents such as sodium tripolyphosphate and potassium tetrapolyphosphate, and other additives.

The amount of the resin in the resin latex (A) is usually in the range of 20 to 75% by weight, particularly preferable being 40 to 60% by weight.

Next, vinyl polymer (B) will be explained. Preferable vinyl polymers (B) used in the present invention are ones capable of causing sharp gelation of an aqueous solution or aqueous dispersion thereof upon heating to a certain temperature, and exhibiting reversible transition between gelation and degelation at a certain temperature. Such vinyl polymers (B) include vinyl polymers containing cation-forming groups and vinyl polymers not containing cation-forming groups, which will be explained respectively in the following.

Examples of the vinyl polymers containing cation-forming groups (B1) are polymers of an ester (b) of a vinyl carboxylic acid with an adduct of an alkylene oxide to a cyclic amine or a non-cyclic amine having 5 or more carbon atoms, and copolymers of not exceeding 50% a by weight of a cation-forming monomer (c3) among vinyl monomers (c) with a radically polymerizable ether compound. As regards the above-mentioned vinyl monomers (c) and other compounds, explanations will be made afterward.

Cyclic amines in the ester (b) of a vinyl carboxylic acid constituting the polymer (B1) are not particularly limited as long as they are cyclic amines having an active hydrogen atom to be reacted with an alkylene oxide, that is, they possess an amino nitrogen atom on or aside the ring. Active hydrogen atom-containing groups may be of an amino group or any groups to which an alkylene oxide can be added like a hydroxyl group or a carboxyl group.

Examples of such cyclic amines include non-aromatic heterocyclic amines, for example, compounds having an aziridine ring such as aziridine, 2-methylaziridine and 2-ethylaziridine, pyrrolidines, such as pyrrolidine, 2-methylpyrrolidine, 2-ethylpyrrolidine, 2-pyrrolidone, succinimide and 1,2-cyclohexane dicarboxylic imide, piperidines, such as piperidine, 2-methylpiperidine, 3,5-dimethylpiperidine, 2-ethylpiperidine, 4-piperidinopiperidine, 2-methyl-4-pyrrolidinopiperidine and ethyl picoliconate, piperazines, such as 1-methylpiperazine and 1-methyl-3-ethylpiperazine, morpholines, such as morpholine, 2-methylmorpholine, 3,5-dimethylmorpholine and thiomorpholine, pyrrolines, such as 3-pyrroline, 2,5-dimethyl-3-pyrroline and 2-phenyl-2-pyrroline, pyrazolines, such as pyrazoline, imidazoles, such as 2-methylimidazole, 2-ethyl-4-methylimidazole and 2-phenylimidazole, pyrazoles, such as pyrazole and pyrazole carboxylic acid, pyridones, such as α-pyridone and γ-pyridone, and ε-caprolactam, pyridazinone, pyridaline, pyridoine, etc.; aromatic heterocyclic amines, such as 2-hydroxypyridine, 2-hydroxy-3,5-di-tert-butylpyridine, 2-carboxylpyridine, 4-pyridylcarbinol, 2-hydroxypyrimidine, pyrrole and 2-phenylpyrrole; as well as aromatic amines, such as aniline, 3-methylaniline, N-methylaniline and N-isopropylaniline.

Preferable among these cyclic amines are non-aromatic heterocyclic amines, particularly preferable being piperidines and morpholines, most preferable being morpholines.

In the ester (b) of a vinyl carboxylic acid constituting the polymer (B1), non-cyclic amines having 5 or more carbon atoms are not particularly limited as long as they are non-cyclic amines having 5 or more carbon atoms and having an active hydrogen atom to be reacted with an alkylene oxide. Examples of such compounds are aliphatic non-cyclic primary amines having 5 or more carbon atoms, such as dimethylpropylamine, 2-ethylbutylamine, pentylamine, 2,2-dimethylbutylamine, hexylamine, cyclohexylamine, octylamine, 2-ethylhexylamine, isodecylamine and laurylamine; aliphatic non-cyclic secondary amine having 5 or more carbon atoms, such as methylbutylamine, methylisobutylamine, methyl-tertbutylamine, methylpentylamine, methylhexylamine, methyl (2-ethylhexyl)amine, methyloctylamine, methylnonylamine, methylisodecylamine, ethylpropylamine, ethylisopropylamine, ethylbutylamine, ethylisobutylamine, ethyl-tert-butylamine, ethylpentylamine, ethylhexylamine, ethyl(2-ethylhexyl) amine, ethyloctylamine, dipropylamine, diisopropylamine, propylbutylamine, propylisobutylamine, propyl-tert-butylamine, propylpentylamine, propylhexylamine, propyl (2-ethylhexyl)amine, propyloctylamine, isopropylbutylamine, isopropylisobutylamine, isopropyl-tert-butylamine, isopropylpentylamine, isopropylhexylamine, isopropyl(2-ethylhexyl)amine, isopropyloctylamine, dibutylamine, diisobutylamine, di-tert-butylamine, butylpentylamine, dipentylamine and dicyclohexylamine. Among non-cyclic amines having 5 or more carbon atoms, preferred are aliphatic non-cyclic primary amines having 5 to 8 carbon atoms.

Examples of alkylene oxides are ethylene oxide, propylene oxide and butylene oxides. Preferable among these are ethylene oxide or propylene oxide and a combination of the two. In the ester (b) of a vinyl carboxylic acid, the number of moles of the alkylene oxide added is usually 1 to 50 mols, preferably 1 to 5 mols.

The ester (b) of a vinyl carboxylic acid constituting the polymer (B1) is obtained by reacting a vinyl carboxylic acid with an adduct of an alkylene oxide to a cyclic amine or a non-cyclic amine having 5 or more carbon atoms as mentioned above. Examples of the vinyl carboxylic acids, wherein a vinyl group and a carboxyl group do not necessarily have to be bound directly to each other, are radically polymerizable unsaturated aliphatic carboxylic acids such as (meth)acrylic acid, (iso)crotonic acid, maleic acid, fumaric acid and itaconic acid; radically polymerizable aromatic carboxylic acids such as vinylbenzoic acid and 2-carboxy-4-isopropenyl-3-pyrrolidine acetic acid; and ester-forming derivatives of these, such as acid anhydrides or acid halides. Preferable among these compounds are (meth)acrylic acid, maleic acid, vinylbenzoic acid and ester-forming derivatives thereof, particularly preferable being (meth)acrylic acid and ester-forming derivatives of (meth)acrylic acid.

The polymer (B1) may be a copolymer of ester (b) of a vinyl carboxylic acid with a vinyl monomer (c), which copolymer contains the ester (b) of a vinyl carboxylic acid as a constituent preferably in an amount of 50% by weight or more, particularly 70% by weight or more. In the copolymer, the vinyl monomer (c) may be either a hydrophilic vinyl monomer or a lipophilic vinyl monomer.

Examples of hydrophilic vinyl monomers are nonionic monomers (c1), such as hydroxyethyl (meth)acrylates, diethylene glycol mono(meth)acrylates, polyethylene glycol mono(meth)acrylates, (meth)acryloyloxy polyglycerols, vinyl alcohol, allyl alcohol, (meth)acrylamides, N-methyl (meth)acrylamides, N-methylol(meth)acrylamides, N-vinyl-2-pyrrolidone, vinylimidazole, N-methylol-ε-caprolactam, N-methylolmaleimide, N-vinylsuccinimide, p-aminostyrene, N-vinylcarbazole, 2-vinylpyridine and 2-cyanoethyl (meth)acrylates; anion-forming monomers (c2) such as (meth)acrylic acids, maleic acid (anhydride), fumaric acid, itaconic acid, vinyl sulfonic acid, (meth)acryl sulfonic acids, styrene sulfonic acid, vinylbenzoic acid, alkylarylsulfosuccinic acid and (meth) acryloylpolyoxyalkylene sulfuric esters; and salts thereof; cation-forming monomers (c3) such as N,N-dimethylaminoethyl (meth)acrylates, N,N-dimethylaminopropyl (meth)acrylates, N,N-diethylaminoethyl (meth)acrylates, N,N-diethylaminopropyl (meth)acrylates, N,N-dimethylaminoethyl (meth)acrylamides and vinylaniline, and acid salts thereof; and monomers having an amine imide group (c4) such as 1,1,1-trimethylamine (meth)acrylimides, 1,1-dimethyl-1-ethylamine (meth)acrylimides, 1,1-demethyl-l-(2'-phenyl-2'-hydroxyethyl)amine (meth) acrylimides and 1,1,1-trimethylamine (meth)acrylimides.

Examples of lipophilic vinyl monomers are (meth) acrylate derivatives such as methyl (meth)acrylates, ethyl (meth)acrylates, butyl (meth)acrylates, cyclohexyl (meth) acrylates, lauryl (meth)acrylates, octadecyl (meth)acrylates, glycidyl (meth)acrylates and trimethoxysilylpropyl (meth) acrylates; N-alkyl (meth)acrylamide derivatives such as N,N-dibutyl (meth)acrylamides and N-cyclohexyl (meth) acrylamides; and (meth)acrylonitriles, styrene, 1-methylstyrene, vinyl acetate, butadiene, vinyl chloride, vinyltrimethoxysilane and isoprene.

The vinyl polymer (B1) can be prepared according to the method described in, for example, JP A 6-9848 by Ohsumi, et al.

Examples of vinyl polymers having no cation-forming groups are polymers of an N-alkyl or N-alkylene (meth) acrylamide (B2) and polymers of a radically polymerizable ether compound. Examples of the polymers of radically polymerizable ether compound are polymers of a polyalkylene glycol monoalkyl ether mono(meth)acrylate or a polyalkylene glycol monophenyl ether mono(meth)acrylate (B3), polymers of a polyethylene glycol monoalkyl monovinyl ether (B4), polymers of a polyethylene glycol monophenyl monovinyl ether (B5) and polymers of a polyethylene glycol monoalkyl monovinyl-phenyl ether (B6). Polymers (B2) to (B6) include copolymers of 2 or more monomers constituting these polymers (B2) to (B6) and copolymers of an N-alkyl or N-alkylene (meth)acrylamide or a polymerizable ether compound constituting the polymers (B2) to (B6) with not more than 50% by weight of a vinyl monomer (c) as mentioned above, excepting the cation-forming compounds.

Typical examples of N-alkyl or N-alkylene (meth) acrylamide monomers constituting the polymer (B2) are N-ethyl (meth)acrylamides, N,N-diethyl (meth)acrylamides, N,N-dimethyl(meth)acrylamides, N-n-propyl (meth) acrylamides, N-isopropyl (meth)acrylamides, N-cyclopropyl (meth)acrylamides, N-(meth) acryloylpiperidines, N-(meth)acryloylpyrrolidines, N-(meth)acryloylhexahydroazines, (meth) acryloylmorpholines, N-tetrahydrofurfuryl (meth) acrylamides, N-methoxypropyl (meth)acrylamides, N-ethoxypropyl (meth)acrylamides, N-isopropoxypropyl (meth)acrylamides, N-ethoxyethyl (meth)acrylamides, N-(2,2-dimethoxyethyl)-N-methyl (meth)acrylamides, N-1-methyl-2-methoxyethyl (meth)acrylamides, N-1-methoxymethylpropyl (meth)acrylamides, N-(1,3-dioxolane-2-yl)-N-methyl (meth)acrylamides, N-8-acryloyl-1,4-dioxa-8-aza-spiro[4,5]decane, and N-methoxyethyl-N-n-propyl (meth)acrylamides.

The polymer (B2) can be obtained according to the method disclosed by Ito et al. in JP A 1-14276.

Examples of polyalkylene glycol monoalkyl or monophenyl mono(meth)acrylates constituting the polymer (B3) are (meth)acrylic acid esters of an adduct of a monohydric alcohol and ethylene oxide, such as polyethylene glycol monomethyl ether mono(meth)acrylates, polyethylene glycol monoethyl ether mono(meth)acrylates, polyethylene glycol monopropyl ether mono(meth)acrylates, polyethylene glycol monobutyl ether mono(meth)acrylates, polyethylene glycol monocyclohexyl ether mono(meth)acrylates.

polyethylene glycol monophenyl ether mono(meth) acrylates; random or block adducts of propylene oxide/ethylene oxide and a monohydric alcohol, such as (poly)oxypropylenepolyoxyethylene glycol monomethyl ether mono(meth)acrylates, (poly)oxypropylene-polyoxyethylene (poly)oxypropylene glycol monomethyl ether mono(meth) acrylates and polyoxyethylene(poly)oxypropylene-polyoxyethylene glycol monomethyl ether mono(meth) acrylates. The degree of polymerization of the polyoxyalkylene in polyalkylene glycol monoalkyl or monophenyl ether mono(meth)acrylate is 2 to 50.

The polymer (B3) can be obtained, for example, according to the method proposed by Matsumoto et al. in JP B 6-23375.

Examples of polyalkylene glycol monoalkyl monovinyl ether constituting the polymer (B4) are vinyl ethers obtainable from vinyl chloride and an adduct of ethylene oxide to a monohydric alcohol, such as polyethylene glycol monoethyl monovinyl ethers, polyethylene glycol monopropyl monovinyl ethers and polyethylene glycol monobutyl monovinyl ethers; and vinyl ethers obtained from vinyl chloride and a random or block adduct of propylene oxide/ethylene oxide to a monohydric alcohol, such as (poly) oxypropylene-polyoxyethylene glycol monomethyl monovinyl ethers and (poly)oxyethylene(poly) oxypropylenepolyoxyethylene glycol monomethyl monovinyl ethers.

Examples of polyalkylene glycol monophenyl monovinyl ethers constituting the polymer (B5) are vinyl ethers obtainable from vinyl chloride and an adduct of ethylene oxide to a phenol, such as polyethylene glycol monophenyl monovinyl ethers. The degree of polyoxyalkylene polymerization in the polyalkylene glycol monoalkyl or monophenyl monovinyl ether mentioned above is 2 to 50.

The polymer (B4) or (B5) can be obtained according to the method described in the Journal of Polymer Science, Part A, Polymer Chemistry, Vol.30, p. 2407(1992).

Polyethylene glycol monoalkyl monovinylphenyl ethers constituting the polymer (B6) include, for example, ones obtainable from vinylphenyl bromide and an adduct of 2 to 50 mol ethylene oxide to a monohydric alcohol. The polymer (B6) can be obtained according to the same method proposed by Matsumoto et al. in JP B 6-23375.

Among the vinyl polymers (B) explained above, the vinyl polymers having cation forming groups are preferable, the polymer (B1) being particularly preferable, because of the effectiveness in suppressing the migration of the binder, the resin in the resin latex (A), onto the surface of the coated layer.

The weight-average molecular weight of the vinyl polymer (B) is usually 1,000 to 5,000,000, preferably 10,000 to 2,000,000 and particularly preferably 100,000 to 1,000,000.

In the thermoreversibly thickening binder composition of the invention the ratio of the solid content (the resin content) of the resin latex (A) to the vinyl polymer (B) is usually (20 to 99.99) to (0.01 to 80), on the basis of weight, preferably (70 to 99.99) to (0.01 to 30) and more preferably (80 to 99.5) to (0.05 to 20). When the ratio of the vinyl polymer (B) is smaller than 0.01% by weight, the binder composition becomes unsatisfactory in gloss, printability and color development properties.

The thermoreversibly thickening binder composition of the invention can be obtained by mixing the resin latex (A) and the vinyl polymer (B) singly or diluted with water at need, by using an ordinary mixing machine such as a paddle agitator, at a temperature lower than that at which the vinyl polymer (B) makes a transition from hydrophilicity to hydrophobicity. By the way, the transition temperature, the temperature at which the vinyl polymer (B) makes a transition from hydrophilicity to hydrophobicity, can be determined by gradually heating up a 1% aqueous solution of the vinyl polymer (B) and measuring the temperature at which the aqueous solution begins to become turbid or gel.

The thermoreversibly thickening binder composition of the invention may optionally contain added thereto water-soluble compound(s) used for color coatings, such as cationized starch, oxidized starch, phosphonated starch, casein, soybean protein, polyvinyl alcohol, maleic acid anhydride resin, carboxymethylcellulose and hydroxyethylcellulose, in order to increase adhesive force with the base paper for coating or to increase water retention of the color coatings.

There can also be added at need, pigments, used for color coatings, for example, various kinds of clay, kaolin, calcium carbonate, satin white, titanium oxide, aluminum hydroxide, barium sulfate, zinc oxide, calcium sulfate, talc and plastic pigments (such as beads of polystyrene, a copolymer of styrene and butadiene, a copolymer of styrene and acrylonitrile and the like).

Furthermore, there may be added at need, additives, for instance, pigment dispersing agents such as sodium pyrophosphate and sodium hexametaphosphate, anti-foaming agents such as mineral oil anti-foaming agents and silicone anti-foaming agents, lubricants and pH adjusters; thickening agents other than the vinyl polymer (B) such as carboxymethylcellulose, antiseptic agents, water resistance agents and printability improving agents.

Methods of preparing color coatings, developer-containing coating materials for pressure-sensitive recording sheets and coating fluids for heat-sensitive recording sheets, using the thermoreversibly thickening binder composition of the invention will be explained in detail.

As an example, a method of preparing a color coating will be described. First, pigment is dispersed into water, with a dispersing apparatus, in the presence of a pigment dispersing agent and an anti-foaming agent, to obtain a pigment slurry. To the slurry, is then added a water-soluble compound as mentioned above dissolved in water, followed by homogenizing them and subsequently adding thereto a thermoreversibly thickening binder composition and an additive as mentioned above to obtain a color coating. As the dispersing apparatus, there may be mentioned a high-speed mixer, a Keddy mill, a speed mill, a sigma-blade kneader, a Morehouse mill and a reed kneader.

When preparing, for example, a coated paper by using a color coating thus obtained, a color coating composed of the binder composition of the invention is usually coated on one side or on both sides of a base paper for coating (high-quality, medium-quality or low-quality) or a coated paper obtained by coating with an ordinary coating color composed of a binder composition different from the binder composition of the invention and then is dried with a dryer, followed by applying a smooth finish to obtain a coated paper.

Coating may be applied with a coating machine into single-layer or multi-layer coat. Coating machines include for example, on-machine or off-machine coaters, equipped with a roll coater (such as a size press and a gate roll coater), a double-side coater (such as a bill-blade coater and a twin-blade coater), various blade coaters (such as a bench-type blade coater and a helicoater), an air-knife coater, a rod coater, a brush coater, a curtain coater, a Champlex coater, a bar coater and a gravure coater. Preferable as a coating machine is a blade coater, which is capable of a high-speed coating. The coating speed is usually 1 to 5000 m/min, preferably 500 to 5000 m/min. The amount of coating is usually 0.1 to 50 g/m², preferably 1 to 25 g/m², as weight after drying.

Drying can be carried out using a dryer, usually at a temperature of 50 to 1500° C. inside the dryer, under heating, such as by means of steam heating, hot-air heating, heating with a gas heater, heating with an electric heater, heating with an infrared heater, heating with a near-infrared heater, high-frequency heating, laser heating and electron beam heating. Dryers include, for example, an infrared dryer, a drum dryer, an air cap dryer, an air wheel dryer and an air conveyer dryer, and combinations thereof. Preferable as a dryer is a combination of an infrared dryer, an air cap dryer and an air wheel dryer, which are capable of carrying out high-speed drying. The drying temperature, while varying with the kind of the dryers, is usually 50 to 1500° C. inside the dryer.

Smooth finish can be carried out by using, either on machine or off machine, any of calenders such as a supercalender, a gloss calender, a soft calender and a machine calender. The pressure and the temperature of finishing are not particularly limited, but there may be used a nip pressure of usually 20 to 500 Kg/cm and a temperature usually from room temperature to 500° C. The number of pressure nips are usually 1 to 15. In addition, for the purpose of moisture conditioning or moistening of coated paper after smooth finish, the above-mentioned calender can be equipped with a roll water coater, an electrostatic moistening apparatus, a steam moistening apparatus, or the like.

In case the thermoreversibly thickening binder composition of the invention is used for preparing pressure-sensitive recording sheet, a developer may be contained in advance according to need. Examples of developers are known ones, including polyvalent metal salts of alkyl-substituted salicylic acids, as described in JP B 61-25174, U.S. Pat. No. 4,748,259 and JP A 2-91043, such as zinc 3,5-di-tert-butyl salicylate and zinc 3,5-di-cyclohexyl salicylate, polyvalent metal salts of a mixture of salicylic acid derivatives substituted by 1 to 3 mol styrene; inorganic solid acids, such as activated clay and bentonite, and phenolic condensates, such as substituted phenol-formaldehyde resins, bisphenol A-formaldehyde resins, and the like.

In addition there may be contained a sensitizer. Examples of sensitizers are polyalkylene glycols, such as polyethylene glycols, polypropylene glycols, polybutylene glycols, polytetramethylene glycols, and block copolymers or random copolymers containing 2 or more kinds of the above-mentioned glycol moieties in the molecular skeleton; and derivatives of these polyalkylene glycols, one or both terminal hydroxyl groups of which have been substituted with an alkyl group having 1 to 6 carbon atoms or an acyl group having 6 to 23 carbon atoms.

There may be added a water-soluble compound as mentioned above, at need, in order to increase the adhesive power with paper or increase the water retention of a developer-containing coating material for pressure-sensitive recording sheet. Furthermore, pigments, and additives, as described above in the preparation of coated papers, or urea-formaldehyde resin may be added at need.

Next, a method of preparing the above-mentioned coating material containing a developer by using the thermoreversibly thickening binder compositions will be explained. Pigment is first dispersed into water with a dispersing apparatus in the presence of a pigment dispersing agent and an anti-foaming agent to obtain a pigment slurry. To the slurry is then added a water-soluble compound as mentioned above, dissolved in water, followed by homogenizing and subsequently adding thereto a thermally reversible binder composition of the invention, a developer in the form of a solvent solution or a water dispersion, a sensitizer and other additives to obtain a developer-containing coating material. Examples of dispersing apparatuses are a high-speed mixer, a Keddy mill, a speed mill, a sigma-blade kneader, a Morehouse mill and a reed kneader. In general, each component can be contained in a developer-containing coating material, in an amount of 30 to 95% by weight of a pigment, 0 to 40% by weight of a water-soluble compound, 2 to 40% by weight of the thermally reversible binder composition of the invention and 1 to 40% by weight of a developer, based on the total solid content contained in the coating material. The content of the sensitizer is usually 1 to 30% by weight, based on the weight of the developer.

A method of preparing pressure-sensitized recording sheet by using a developer-containing coating material will be explained. Pressure-sensitive recording sheet can be usually obtained by coating a developer-containing coating material, with a coating machine, onto substrate, such as a base paper (high-quality paper, medium-quality paper or low-quality paper), a coated paper, a synthetic paper, a synthetic resin film or the like, followed by drying it with a dryer. If necessary, smooth finish may be applied.

Coating can be applied with a coating machine into single-layer or multi-layer coat. Coating machines include the same ones as described above. Preferable as coating machines is a blade coater, which is capable of a high-speed coating. The speed of coating is usually 1 to 5000 m/min, preferably being 500 to 5000 m/min. The amount of coating is usually 0.1 to 20 g/m², preferably 1 to 10 g/m² as the weight of the solid content after drying.

Drying may be carried out with a dryer, same as described in the above-mentioned preparation of coated paper. The temperature of drying, while varying with the kind of the dryer used, is usually 50 to 1500° C. inside the dryer.

Smooth finish, which is applied according to need, can be carried out in the same method as described in the above-mentioned preparation of coated paper.

Preparation of a developer-containing coating material for preparing heat-sensitive recording sheet, by using the thermoreversively thickening binder composition of the invention, will next be explained. The binder composition of the invention can contain in advance a color producing agent, a developer or a sensitizer according to need. Color producing agents may be those generally used for heat-sensitive recording materials, for example, triarylmethanes, diphenylmethanes, xanthenes, phenothiazines and spiropyrans as disclosed in JP A 4-173392. These color producing agents may be used as a mixture of 2 or more kinds.

Examples of developers are bisphenol developers, hydroxyaryl carboxylic acid developers and sulfone developers, as disclosed in JP A 4-173392. These developers may be used with 2 or more kinds mixed together.

Examples of sensitizers are benzylbiphenyls as disclosed in JP A 60-82382 and 1,2-bis(phenoxy)ethane as disclosed in JP A 60-56588. These sensitizers may be used with 2 or more kinds mixed together.

There may also be added at need, water-soluble compounds, pigments, pigment dispersing agents, anti-foaming agents and other additives, in the same way as in the preparation of coated papers; or thermofusible compounds having melting points of 50 to 200° C., for example, higher fatty acid amides, such as stearylamide, methylene bisstearylamide, oleylamide, coconut oil fatty amide, bisamides such as ethylene-bis-stearylamide, urea compounds such as N-decyl-N'-lauryl urea and N-stearyl-N'-dococyl urea, stearic acid, and waxes such as polyethylene, carnauba wax, beeswax and paraffin wax. Furthermore, lubricants, for example, metal salts of higher fatty acids, such as zinc stearate, calcium stearate, magnesium stearate, lead stearate, cadmium stearate, barium stearate and aluminum stearate, stearic acid, and waxes, such as polyethylene, carnauba wax, beeswax and paraffin wax may be added.

A method of preparing a coating fluid for heat-sensitive recording sheet by using the thermoreversibly thickening binder composition of the invention will be illustrated. Mixtures of a sensitizer with a binder composition of the invention, of a color producing agent with a binder composition of the invention, and of a developer with a binder composition of the invention are respectively added into water, optionally with a surfactant such as sodium 2-ethylhexyl sulfosuccinate, a sodium naphthalene-sulfonate-formaldehyde condensate or the like, and dispersed and ground into particles of smaller than $10\mu$, preferably smaller than $3\mu$, by using a grinder, such as a ball mill, an attritor or a sand grinder, to obtain respective dispersions, followed by blending them to prepare a coating fluid.

The amount of the sensitizer used is usually 1 to 200 parts by weight per 100 parts by weight of the developer, and the amount of the developer used is usually 5 to 100 parts by weight per 100 parts by weight of the color producing agent. The amount of the binder composition of the invention used is usually 2 to 90% by weight, based on the total solid content of the coating solution.

A method of preparing heat-sensitive recording sheet by using a coating fluid is explained. A coating fluid, which may be each dispersion singly or in the form of a dispersion mixture according to the method of coating, is applied onto a substrate to obtain a heat-sensitive recording material. The coating fluid may be a three-component dispersion blend, a two-component dispersion blend or a one-package formulation, in accordance with the method of coating.

Heat-sensitive recording sheet can be obtained by applying a coating fluid onto a substrate, such as base paper (high-quality paper, medium-quality paper or low-quality paper), synthetic paper, synthetic resin film or the like, followed by drying it with a dryer at need. A smooth finish can be applied according to need. Coating machines and coating speed used in the coating process may be the same as in the preparation of pressure-sensitive sheet described above.

Methods of coating include, for instance, (1) those by coating a substrate with a dispersion containing a sensitizer, a color producing agent and a developer, (2) those by coating a substrate with a dispersion containing a color producing agent and a developer, and then with a dispersion containing a sensitizer, (3) those by coating a substrate with a dispersion containing a sensitizer, and then with a dispersion containing a color producing agent and a developer, (4) those by coating a substrate with a dispersion containing a developer, followed by coating it with a dispersion containing a sensitizer and then with a dispersion containing a color producing agent, (5) those by coating a substrate with a dispersion containing a sensitizer, followed by coating it with a dispersion containing a color producing agent and then with a dispersion containing a developer, (6) those by coating a substrate with a dispersion containing a sensitizer and a color developing agent, and then with a dispersion containing a sensitizer and a developer, and (7) those by coating a substrate with a dispersion containing a sensitizer and a developer, and then with a dispersion containing a sensitizer and a color producing agent.

Drying and smooth finishing, which are carried out according to need, can be done in the same way as in the preparation of pressure-sensitive recording sheet.

The thickness of each coated layer, which is not particularly limited and can vary depending upon the form of the heat-sensitive recording materials and other conditions, is usually 0.5 to 20 $g/m^2$, preferably 1 to 15 $g/m^2$ and particularly preferably 3 to 10 $g/m^2$, based on the dried weight.

EXAMPLES

The invention will be explained in more detail with reference to the following examples; however the invention is not limited to these. In the examples, the word "parts" means "parts by weight".

Preparation Example 1

100 parts of 2-morpholinoethyl methacrylate (that is methacrylic ester of 1 mol ethylene oxide adduct of morpholine) and 0.1 part of 2,2'-azobis(2,4-dimethylvaleronitrile) were charged into an ampule, which was sealed after deaeration and evacuation under freezing, followed by effecting polymerization for 8 hours at 50° C. to obtain Polymer 1.

Preparation Example 2

90 parts of 2-(2-morpholinoethoxy)ethyl methacrylate (that is methacrylic ester of 2 mols ethylene oxide adduct of morpholine), 10 parts of methyl methacrylate and 0.1 part of 2,2'-azobis(2,4-dimethylvaleronitrile) were charged into an ampule, which was sealed after deaeration and evacuation under freezing, followed by effecting polymerization for 8 hours at 60° C. to obtain Polymer 2.

Preparation Example 3

80 parts of 2-morpholinopropyl methacrylate (that is methacrylic ester of 1 mol propylene oxide adduct of morpholine), 5 parts of styrene, 10 parts of methyl methacrylate, 5 parts of hydroxyethyl methacrylate and 0.1 part of 2,2'-azobis(2,4-dimethylvaleronitrile) were charged into an ampule, which was sealed after deaeration and evacuation under freezing, followed by effecting polymerization for 8 hours at 50° C. to obtain Polymer 3.

Preparation Example 4

80 parts of 2-(2-piperidinoethoxy)ethyl methacrylate, 10 parts of N,N-dibutylacrylamide, 10 parts of styrene and 0.5 part 2,2'-azobis(2,4-dimethylvaleronitrile) were charged into an ampule, which was sealed after deaeration and evacuation under freezing, followed by effecting polymerization for 8 hours at 50° C. to obtain Polymer 4.

Preparation Example 5

80 parts of an acrylic ester of 4 mols ethylene oxide adduct of dimethylpropylamine, 20 parts of methyl methacrylate and 0.5 part of 2,2'-azobis(2,4-dimethylvaleronitrile) were charged into an ampule, which was sealed after deaeration and evacuation under freezing, followed by effecting polymerization for 8 hours at 50° C. to obtain Polymer 5.

Preparation Example 6

Into a pressure reaction vessel, equipped with an agitator, a dropping bottle, a nitrogen gas inlet tube and a thermometer, were charged 10 parts of sodium salt of an acryloyloxypolyoxypropylene (the degree of polymerization=12) sulfate as an emulsifier having a radically polymerizable group, 102 parts of water, 45 parts of styrene, 9 parts of methyl methacrylate, 4 parts of methacrylic acid, 1 part of sodium persulfate and 0.2 part of lauryl mercaptan, and the atmosphere within the reaction vessel was substituted with nitrogen gas, under stirring, followed by introducing 37 parts of butadiene thereinto under pressure from the dropping bottle and reacting them first at 50° C. for 30 hours and then at 85° C. for 5 hours. The reaction mixture was adjusted to pH 8.5 by adding an aqueous solution of sodium hydroxide and unreacted monomers were stripped out under reduced pressure to obtain SBR resin latex 1 (solid content 47.9%; hereinafter referred to as SBR 1). The amount of the emulsifier in the water phase of SBR 1 was 0.0003 mmol/g resin.

Preparation Example 7

In the same way as in Preparation Example 6, 50 parts of styrene, 4 parts of methyl methacrylate, 4 parts of methacrylic acid, 5 parts of acrylonitrile, 32 parts of butadiene and 10 parts of sodium salt of an acryloyloxypolyoxypropylene (the degree of polymerization=9) sulfate were reacted to obtain SBR resin latex 2 (solid content 48.3%; hereinafter referred to as SBR 2). The amount of the emulsifier in the water phase of SBR 2 was 0.0005 mmol/g resin.

Preparation Example 8

In the same way as in Preparation Example 6, except that 10 parts of a sodium alkyldiphenyl ether disulfonate (Eleminol MON-7 manufactured by Sanyo Chemical Industries, Ltd.) was used as emulsifier, SBR resin latex 3 for comparison (solid content 48.2%; hereinafter referred to as SBR 3) was obtained. The amount of the emulsifier in the water phase of SBR 3 was 0.1 mmol/g resin.

Preparation Example 9

In the same way as in Preparation Example 6, 45 parts of styrene, 9 parts of methyl methacrylate, 3 parts of methacrylic acid, 38 parts of butadiene and 5 parts of sodium p-styrene sulfonate (Spilmer NaSS manufactured by Toso Co., Ltd.) were reacted to obtain SBR resin latex 4 for comparison (solid content 48.6%; hereinafter referred to as SBR 4). The amount of the emulsifier in the water phase of SBR 4 was 0.05 mmol/g resin.

Preparation Example 10

Into a 1 liter stainless steel vessel, were charged 138 parts of salicylic acid, 5.5 parts of zinc acetate and 52 parts of styrene and then heated up to 155° C. under stirring, followed by adding thereto 156 parts of styrene dropwise over 2 hours at 145° C. and further maintaining at the same temperature for 1 hour to obtain a liquid substance. To the liquid substance, were added 205 parts of toluene and 48 parts of basic zinc carbonate (zinc content 58%), and stirred under reflux for 2 hours, followed by adding 29 parts of polytetramethylene glycol having a number-average molecular weight of 3,000 to obtain a toluene solution of a developer and a sensitizer of a solid content of 67%. Into an aqueous solution containing 3.3 parts of polyvinyl alcohol (Kuraray Poval PVA 205) in 100 parts of water was added 100 parts of the above-mentioned toluene solution of the developer and the sensitizer, under stirring with a homomixer (manufactured by Tokushu Kika Co., Ltd.) at 10,000 rpm, to disperse them. Thereafter, toluene was distilled off by heating to obtain an aqueous dispersion of the developer and the sensitizer of a solid content of ca. 50%.

Reference Examples 1 and 2

The resin latex (SBR 1), prepared in Preparation Example 6, was evaluated for the chemical stability to an aqueous solution of aluminum sulfate. To 100 g of SBR 1 was added, while being stirred gently, 3 g of an aqueous solution of aluminum sulfate of 10% by weight concentration. Upon allowing the resulting latex to stand at room temperature, it took more than 30 hours (Chemical Stability Index>30) before the whole latex lost fluidity and coagulated into solid.

In the same way, the resin latex prepared in Preparation Example 9 (SBR 4) was evaluated for the chemical stability, the time required for the latex to coagulate being 11 hours (Chemical Stability Index 11).

Reference Examples 3 to 6

Composition A, which was obtained by admixing 0.7 part of a 10% aqueous solution of Polymer 1 obtained in Preparation Example 1 and 14 parts of SBR 1 obtained in Preparation Example 6, was evaluated for temperature-sensitive gelling properties. Composition A, when heated for 15 minutes at 80° C. on a water bath, lost fluidity and gelled as a whole, exhibiting temperature-sensitive gelling properties. After being cooled down to 25° C., the gelled Composition A returned to the same state of a low viscosity as observed before the heating, thereby reversible gelling properties being confirmed.

In the same way, Composition B, which was obtained by using SBR 4 obtained in Preparation Example 9 instead of SBR 1 obtained in Preparation Example 6, was evaluated for temperature sensitive gelling properties. Composition B, after being heated for 15 minutes at 80° C., showed no change in fluidity and remained in a state of low viscosity, exhibiting no gelling properties.

Composition C, which was obtained by adding 1.5 parts of 8% (as zinc oxide) aqueous solution of zinc ammonium carbonate to 10 parts of the composition B, was evaluated for temperature-sensitive gelling properties, giving no sign of temperature-sensitive gelling properties as in the case of Composition B.

Composition D was prepared by adding 5 parts of a 25% aqueous solution of an adduct of an alkylene oxide to an alkylphenol-formaldehyde condensate (Latem NP-5150 manufactured by Kao Co., Ltd.) and 15 parts of 8% (as zinc oxide) aqueous solution of zinc ammonium carbonate to 100 parts of SBR 4. Composition D, when heated at 80° C. for 15 minutes, lost fluidity and gelled as a whole. After being cooled down to 25° C., Composition D remained gelled, without returning to the state of low viscosity before the heating.

EXAMPLES 1 to 5 AND COMPARATIVE EXAMPLES 1 to 3

25 parts of water, 0.3 part of a dispersing agent (SN Dispersant 5040, manufactured by San Nopco, Ltd.), 0.1 part of sodium hydroxide, 0.1 part of anti-foaming agent (Nopco DF 122, manufactured by San Nopco, Ltd.), 35 parts of clay and 15 parts of calcium carbonate were mixed and dispersed for 30 minutes with a DESPA at 2000 rpm. To the resulting dispersion, were added 14.1 parts of Binder composition 1 obtained by mixing 8.3 parts of α-converted phosphorylated starch (a 30% aqueous solution), 0.07 part of a 40% aqueous solution of Polymer 1 obtained in Preparation Example 1 and 14 parts of SBR 1 obtained in Preparation Example 6, followed by blending them homogeneously to obtain Color coating 1 of Example 1.

By the same procedure as described above, were obtained, respectively, Color coating 2 of Example 2 from Binder composition 2 prepared by mixing Polymer 2 with SBR1, Color coating 3 of Example 3 from Polymer 3 and SBR 2, Color coating 4 of Example 4 from Polymer 4 and SBR 2 and Color coating 5 of Example 5 from Binder composition 5 prepared by mixing Polymer 5 with SBR 1.

Also obtained were Color coating 6 of Comparative Example 1 by using Binder composition 6 prepared by mixing Polymer 1 with SBR 3, Coating color 7 of Comparative Example 2 by using Binder composition 7 prepared by mixing Polymer 1 with SBR 4, and Color coating 8 of Comparative Example 3 by using Binder composition 8 prepared by mixing SBR 1 with carboxymethylmethylcellulose instead of Polymer 1.

Each Color coating 1 to 8 was coated onto single side of a medium quality paper of 58 g/m$^2$, in a dry spread of about 10 g/m$^2$ by using a helicoater at a speed of 800 m/min., followed by drying in hot air of 150° C. for 30 seconds and then cutting. Thereafter, each paper thus coated was treated with a mini-supercalender twice at a temperature of 50° C. and a nip pressure of 90 Kg/cm to prepare each Coated paper 1 to 8, which was submitted to measurements of various properties. The results are shown in Table 1.

TABLE 1

|  | Examples | | | | | Comparative Examples | | |
| --- | --- | --- | --- | --- | --- | --- | --- | --- |
|  | 1 | 2 | 3 | 4 | 5 | 1 | 2 | 3 |
| Color Coating No. | 1 | 2 | 3 | 4 | 5 | 6 | 7 | 8 |
| Gloss of White Paper (%) | 65 | 64 | 66 | 70 | 69 | 54 | 55 | 53 |
| Whiteness (%) | 68 | 67 | 69 | 65 | 70 | 65 | 66 | 63 |
| Printing Gloss (%) | 73 | 75 | 78 | 79 | 70 | 65 | 66 | 66 |
| Ink Receptivity (%) | 23 | 25 | 20 | 24 | 22 | 12 | 12 | 13 |
| Ink Setting | 5 | 5 | 5 | 5 | 5 | 3 | 3 | 3 |
| Calender Staining | 5 | 5 | 5 | 5 | 5 | 3 | 3 | 4 |

Printing Test; Test piece was printed all over with offset ink using a RI-2 Model (Manufactured by Akira Co., Ltd.).
Gloss; 75° Gloss was measured by using a gloss meter (manufactured by Tokyo Denshoku Co., Ltd.).
Whiteness; Measured according to Japanese Industrial Standard(JIS) P-8123.
Ink Receptivity; Test piece was printed with a K&N-ink, and the ink on the printed surface was wiped off with a gauze two minutes after, followed by measuring whiteness of the wiped surface. The result was expressed by the percentage loss of whiteness as compared with the whiteness before printing.
Ink Setting; A commercial coated paper was pressed onto the printed surface 2 minutes after having been printed, and the transfer of the ink was observed and evaluated by giving 5 grades. The results were expressed from grade 1(inferior) to 5(superior).
Calender Staining; Test piece was treated with a supercalender under conditions of a temperature of 75° C. and a nip pressure of 150 Kg/cm, and stain on the roll was observed and evaluated by giving 5 grades. The results were expressed from grade 1(remarkable stain) to 5(no stain).

EXAMPLES 6 TO 10 AND COMPARATIVE EXAMPLES 4 AND 5

32.4 parts of water, 0.5 part of a dispersing agent (SN Dispersant 5040, manufactured by San Nopco, Ltd.) and 48.4 parts of light calcium carbonate were dispersed for 15 minutes with a DESPA at 2000 rpm, followed by adding thereto 39.4 parts of a 10% by weight aqueous solution of polyvinyl alcohol (Kuraray Poval PVA 205), 10 parts of a water dispersion obtained in Preparation Example 9 and 14.1 parts of Binder composition 1, which was obtained by mixing 0.07 part of a 40% aqueous solution of Polymer 1 obtained in Preparation Example 1 with 14 parts of SBR 1 obtained in Preparation Example 6, to obtain Developer-containing coating material 1 of Example 6.

By the same procedure as described above, were obtained, respectively, Developer-containing coating material 2 of Example 7 from Binder composition 2 prepared by mixing Polymer 2 with SBR 1, Developer-containing coating material 3 of Example 8 from Binder composition 3 prepared by mixing Polymer 3 with SBR 2, Developer-containing coating material 4 of Example 9 from Binder composition 4 prepared by mixing Polymer 4 with SBR 2, and Developer-containing coating material 5 of Example 10 from Binder composition 5 prepared by mixing Polymer 5 with SBR 1. Also obtained were Developer-containing coating material 6 of Comparative Example 4 from Binder composition 6 prepared by mixing Polymer 1 and SBR 3 and Developer-containing coating material 7 of Comparative Example 5 from Binder composition 8 prepared by mixing SBR 1 with carboxymethylmethylcellulose instead of Polymer 1.

Each coating material 1 to 7 was coated onto a medium quality paper of 58 g/m$^2$ in a dry spread of 5 g/m$^2$ with a bench blade coater (manufactured by SNT Co., Ltd.) at a speed of 18 m/min., followed by drying it in hot air of 130° C. for 6 seconds and then cutting to obtain each developer (pressure-sensitive) sheet 1 to 7. Within an air-conditioned room of 23° C. and 50% RH, onto the coating surface of each developer sheet, was superposed a commercial blue color developing high-quality paper having crystal violet lactone as a color producing dye. Each sheet was passed through a roll calender, and developed color density of the calendered sheet was measured respectively 15 seconds, 1 minute and 1 hour after with a Macbeth densitometer (Model Rd 914, manufactured by Division of Kollmorgen Instruments Corporation). The results are tabulated in Table 2.

TABLE 2

|  | Examples | | | | | Comparative Examples | |
| --- | --- | --- | --- | --- | --- | --- | --- |
|  | 6 | 7 | 8 | 9 | 10 | 4 | 5 |
| No. of Developer-containing Coating Material | 1 | 2 | 3 | 4 | 5 | 6 | 7 |
| Developed Color Density |  |  |  |  |  |  |  |
| After 15 sec. | 0.60 | 0.62 | 0.59 | 0.62 | 0.61 | 0.43 | 0.44 |
| After 1 min. | 0.69 | 0.71 | 0.68 | 0.69 | 0.73 | 0.53 | 0.54 |
| After 1 hr. | 0.76 | 0.77 | 0.74 | 0.75 | 0.78 | 0.66 | 0.63 |

EXAMPLES 11 TO 15 AND COMPARATIVE EXAMPLES 6 AND 7

Binder composition 9 was obtained by mixing 3 parts of a 10% aqueous solution of Polymer 1 obtained in Preparation Example 1 and 80 parts of SBR 1 obtained in Preparation Example 6. Then, 20 parts of phenyl-(4'phenyl) phenylmethane, 20 parts of calcium carbonate, 52 parts of water and 8.3 parts of Binder composition 8 were ground and dispersed for 24 hours with a ball mill to obtain Sensitizer dispersion 1. A mixture of 10 parts of 2-anilino-3-methyl-6-N-ethyl-6-isoamyl-fluorane, 6.2 parts of Binder composition 9 and 84 parts of water was ground and dispersed for 24 hours with a ball mill to obtain Color producing agent dispersion 1. Thereafter, 30 parts of bisphenol A, 10 parts of zinc stearate, 10 parts of calcium carbonate, 52 parts of water and 8.3 parts of Binder composition 9 and 52 parts of water were ground and dispersed for 24 hours with a ball mill to obtain Developer dispersion 1. Coating solution 1 of Example 11 was prepared by thoroughly mixing together 100 parts each of these dispersions.

By the same process as described above, were obtained, respectively, Coating solution 2 of Example 12 from Binder composition 10 prepared by mixing Polymer 2 with SBR 1, Coating solution 3 of Example 13 from Binder composition 11 prepared by mixing Polymer 3 with SBR 2, Coating solution 4 of Example 14 from Binder composition 12 prepared by mixing Polymer 4 with SBR 2, and Coating solution 5 of Example 15 from Binder composition 13 prepared by mixing Polymer 5 with SBR 1.

Besides, were also obtained Coating solution 6 of Comparative Example 6 from Binder composition 14 prepared by mixing Polymer 1 with SBR 3 and Coating solution 7 of Comparative Example 7 from Binder composition 15 prepared by mixing SBR 1 with carboxymethylcellulose instead of Polymer 1.

Each coating solution was coated onto a high quality paper of basis weight of 50 g/m² in a dry spread of 6 g/m² with a doctor blade, followed by drying it for 10 seconds at 60° C. and then for 5 hours at room temperature to obtain each heat-sensitive sheet of Examples 11 to 15 and Comparative Examples 6 and 7, which was submitted to measurements of color development properties (dynamic and static color development properties). The results are tabulated in Table 3.

TABLE 3

|  | Examples | | | | | Comparative Examples | |
| --- | --- | --- | --- | --- | --- | --- | --- |
|  | 11 | 12 | 13 | 14 | 15 | 6 | 7 |
| No. of Coating Solution | 1 | 2 | 3 | 4 | 5 | 6 | 7 |
| Dynamic Color Development Properties | 1.40 | 1.41 | 1.39 | 1.42 | 1.43 | 1.20 | 1.23 |
| Static Color Development Properties | 1.25 | 1.28 | 1.26 | 1.30 | 1.28 | 1.10 | 0.99 |

1) Dynamic Color Development Properties Test

Each heat-sensitive sheet thus prepared was developed with a MSI thermal head color developing apparatus, under conditions of 1.0 millisecond and electrical voltage of 22 volts, to test the relation between the operating time (pulse width) and the developed color density. The color density was determined by measuring the density of reflection with a Macbeth densitometer (manufactured by Macbeth Co. Ltd.). The higher the value the higher the color density.

2) Static Color Development Properties Test

Each heat-sensitive recording sheet thus prepared was developed with a thermal gradient heat sealer, under conditions of temperature range of 100° C., sinking of 2 Kg/cm and contact pressing time of 2 seconds, and the density of reflection of being measured by using a Macbeth densitometer.

INDUSTRIAL APPLICABILITY OF THE INVENTION

The binder composition of the invention is capable of providing coated papers excellent in gloss and printability, because migration of the resin latex onto the surface of the coated layer is suppressed even in drying at high temperatures and at high speeds. Having a capability of high-speed coating, the binder composition of the invention can provide coated papers excellent in gloss and printability with a high productivity. Further, pressure-sensitive or heat-sensitive sheets excellent in color producing properties can be obtained at a high production speed. Because the amount of emulsifier in the aqueous phase of the latex is small, the composition has an advantage of causing no stains on super-calender. Furthermore, the binder composition of the invention, exhibiting superior properties of suppressing migration, is useful owing thereto as coating materials or impregnants for various kinds of fabrics, films or sheets (including metal plates), and also as adhesives and binders for coatings.

What is claimed is:

1. A binder composition, which comprises (A) a resin latex comprising binder resin particles dispersed in an aqueous phase, wherein an amount of emulsifier in the aqueous phase of the resin latex (A) is not larger than 0.01 mmole/g resin, and (B) a vinyl polymer having a reversibility of hydrophilicity and hydrophobicity at a certain transition temperature; whereby the binder composition has a thermoreversible thickening property and, when used to form a coated layer on a substrate, exhibits suppressed migration of the binder resin particles onto a surface of the coated layer; wherein said resin latex (A) is a latex of a polymer of a radically polymerizable monomer and is obtained by using an emulsifier having a radically polymerizable group.

2. The binder composition of claim 1, wherein said radically polymerizable monomer is selected from the group consisting of styrenes, conjugated dienes, (meth)acrylic esters, vinyl cyanides and ethylenically unsaturated carboxylic acids.

3. The binder composition of claim 1, wherein said emulsifier comprises a (meth)acrylic ester or an aromatic vinyl compound having an anionic group and a polyoxypropylene chain.

4. The binder composition of claim 3, wherein said anionic group is a sulfonate salt group or a carboxylate salt group.

5. The binder composition of claim 1, wherein said vinyl polymer is a polymer having a cation-forming group.

6. The binder composition of claim 1, wherein said vinyl polymer (B) comprises a polymer of an ester of a vinyl carboxylic acid with an adduct of an alkylene oxide to a cyclic amine or to a non-cyclic amine having 5 or more carbon atoms.

7. The binder composition of claim 6, wherein said cyclic amine is a morpholine or a piperidine.

8. The binder composition of claim 6, wherein said vinyl carboxylic acid is acrylic acid, methacrylic acid, maleic acid or vinylbenzoic acid.

9. The binder composition of claim 1, wherein said binder resin is a homopolymer or a copolymer of one or more monomers selected from the group consisting of (meth) acrylic esters, (meth)acrylamides, vinyl cyanides, styrenes, vinyl carboxylates, conjugated dienes, ethylenically unsaturated carboxylic acids, (meth)acrylamine imides, vinyl trimethoxysilane, vinyl alcohol, vinyl chloride, allyl alcohol, N-vinyl-2-pyrrolidone, vinyl imidazole, N-methylol-ε- caprolactam, N-methylolmaleimide, N-vinylusccinimide, N-vinylcarbazole, 2-vinylpyridine, vinyl sulfonic acids, (meth)acrylic sulfonic acids, styrene sulfonic acid, alkyl allyl sulfosuccinates, (meth)acryloylpolyoxyalkylene sulfuric esters and vinyl aniline.

10. The binder composition of claim 1, wherein said binder resin is at least one resin selected from the group consisting of styrene-butadiene resins, styrene-acrylic resins, acrylic resins, vinyl acetate resin and ethylene-vinyl acetate resin.

11. The binder composition of claim 1, wherein said resin latex (A) is selected from the group consisting of (i) one obtained by emulsion polymerization of a polymerizable monomer or monomers using an emulsifier having a radically polymerizable group, and (ii) one obtained by solution polymerization in an organic solvent of a polymerizable monomer or monomers having an ionizable group followed by neutralizing the resulting polymer with an acid or an alkali, emulsifying it by adding water and then removing the solvent.

12. The binder composition of claim 1, wherein said resin latex (A) contains the binder resin in an amount of 20–75% by weight based on the weight of said resin latex (A).

13. The binder composition of claim 1, wherein said emulsifier is selected from the group consisting of anionic (meth)acrylic esters, anionic (meth)acrylamides, anionic allyl compounds, anionic maleic esters, anionic itaconic esters, anionic aromatic vinyl compounds, nonionic (meth)acrylic esters, nonionic (meth)acrylamides, nonionic allyl compounds, nonionic maleic esters, nonionic itaconic esters, nonionic aromatic vinyl compounds, cationic (meth)acrylic esters, cationic (meth)acrylamides, cationic allyl compounds, cationic maleic esters, cationic itaconic esters and cationic aromatic vinyl compounds.

14. The binder composition of claim 1, wherein said vinyl polymer (B) is selected from the group consisting of (B1) homopolymers or copolymers of an ester of a vinyl carboxylic acid with an adduct of an alkylene oxide to a cyclic amine or to a non-cyclic amine containing 5 or more carbon atoms, containing at least 50% by weight of units of said ester, with or without another vinyl monomer; (B2) homopolymers or copolymers of an N-alkyl or N-alkylene (meth)acrylamide; (B3) homopolymers or copolymers of a polyalkylene glycol monoalkyl ether mono(meth)acrylate or a polyalkylene glycol monophenyl ether mono(meth)acrylate; (B4) homopolymers or copolymers of a polyethylene glycol monoalkyl monovinyl ether; (B5) homopolymers or copolymers of a polyethylene glycol monophenyl monovinyl ether; and (B6) homopolymers or copolymers of a polyethylene glycol monoalkyl monovinylphenyl ether.

15. The binder composition of claim 1, which contains said resin latex (A) and said vinyl polymer (B) in a weight ratio of the resin component of (A) to (B) of 20–99.99/0.01–80.

16. A color coating composition, which comprises the composition of claim 1, a water-soluble compound, a pigment, a pigment dispersing agent and an anti-foam agent.

17. A binder coating material for a heat-sensitive or pressure-sensitive recording sheet, which material comprises a binder composition and a developer; said binder composition comprising (A) a resin latex comprising binder resin particles dispersed in an aqueous phase, wherein the amount of an emulsifier in the aqueous phase is not larger than 0.01 mmole/g resin, and (B) a vinyl polymer having a reversibility of hydrophilicity and hydrophobicity at a certain transition temperature; whereby the binder composition has a thermoreversible thickening property and, when used to form a coated layer on a substrate, exhibits suppressed migration of the binder resin particles onto a surface of the coated layer.

18. The coating material of claim 17, which further comprises at least one additive selected from the group consisting of a sensitizer, a water-soluble compound, pigments, a pigment dispersing agent and anti-foam agents.

* * * * *